US009765668B2

(12) United States Patent
Maus et al.

(10) Patent No.: US 9,765,668 B2
(45) Date of Patent: Sep. 19, 2017

(54) METHOD FOR DETERMINING AN AMOUNT OF LIQUID REMOVED FROM A TANK AND REDUCING AGENT SUPPLY DEVICE FOR A MOTOR VEHICLE

(75) Inventors: Wolfgang Maus, Bergisch Gladbach (DE); Ludwig Wieres, Overath (DE); Jan Hodgson, Troisdorf (DE); Rolf Brück, Bergisch Gladbach (DE)

(73) Assignee: EMITEC Gesellschaft fuer Emissiontechnologie mbH, Lohmar (DE)

( * ) Notice: Subject to any disclaimer, the term of this patent is extended or adjusted under 35 U.S.C. 154(b) by 0 days.

(21) Appl. No.: 13/548,419

(22) Filed: Jul. 13, 2012

(65) Prior Publication Data
US 2012/0304626 A1 Dec. 6, 2012

Related U.S. Application Data

(63) Continuation of application No. PCT/EP2011/050121, filed on Jan. 6, 2011.

(30) Foreign Application Priority Data

Jan. 13, 2010 (DE) ........................ 10 2010 004 615

(51) Int. Cl.
*F01N 3/00* (2006.01)
*F01N 3/20* (2006.01)
*G01F 1/708* (2006.01)

(52) U.S. Cl.
CPC ............ *F01N 3/208* (2013.01); *G01F 1/708* (2013.01); *F01N 2610/02* (2013.01);
(Continued)

(58) Field of Classification Search
CPC ............ F01N 3/208; F01N 2900/1812; F01N 2900/1814; F01N 2900/1821; G01F 1/708
(Continued)

(56) References Cited

U.S. PATENT DOCUMENTS 5,006,829 A * 4/1991 Miyamoto et al. ........... 340/459
5,283,548 A 2/1994 Kanno
(Continued)

FOREIGN PATENT DOCUMENTS

DE  3128168 A1   2/1983
DE  198 07 935 C1  8/1999
(Continued)

OTHER PUBLICATIONS

International Search Report of PCT/EP2011/050121.

*Primary Examiner* — Mark Laurenzi
*Assistant Examiner* — Jason Sheppard
(74) *Attorney, Agent, or Firm* — Laurence A. Greenberg; Werner H. Stemer; Ralph E. Locher

(57) ABSTRACT

A method for determining an amount of liquid removed from a tank per unit time includes discontinuously feeding the liquid to exhaust gas of an internal combustion engine by at least feeding the liquid through an injection line into the exhaust gas, measuring pressures simultaneously at least at two points in the injection line and determining an amount of liquid fed in per unit time from the measured pressures. The amount of liquid removed between a first point in time and a second point in time is further derived by integrating the amounts of liquid removed per unit time over a period of time from the first point in time to the second point in time. The method allows the precise consumption of the liquid to be calculated and the remaining amount of liquid in the tank to be additionally determined. On-board diagnosis is further possible with the method.

17 Claims, 1 Drawing Sheet

(52) U.S. Cl.
CPC ............ *F01N 2610/1406* (2013.01); *F01N 2900/1812* (2013.01); *F01N 2900/1814* (2013.01); *Y02T 10/24* (2013.01)

(58) Field of Classification Search
USPC ........................................ 73/861.43, 861.44
See application file for complete search history.

(56) References Cited

U.S. PATENT DOCUMENTS

| | | |
|---|---|---|
| 6,192,676 B1 | 2/2001 | Zurbig et al. |
| 6,273,120 B1 | 8/2001 | Hofmann et al. |
| 2004/0163459 A1 | 8/2004 | Christian et al. |
| 2006/0173607 A1 | 8/2006 | Matsuo |
| 2007/0022826 A1 | 2/2007 | Palazzolo et al. |
| 2008/0245058 A1 | 10/2008 | Boddy et al. |
| 2008/0276598 A1* | 11/2008 | Gresens ............... 60/286 |
| 2009/0255232 A1* | 10/2009 | Barcin ............... 60/274 |
| 2010/0139254 A1* | 6/2010 | Sebestyen et al. ........ 60/286 |
| 2011/0083424 A1* | 4/2011 | Wang et al. ............ 60/277 |
| 2011/0126529 A1* | 6/2011 | Park ............... 60/303 |
| 2011/0314820 A1* | 12/2011 | Plougmann ............ 60/689 |

FOREIGN PATENT DOCUMENTS

| | | |
|---|---|---|
| EP | 1 091 197 A2 | 4/2011 |
| FR | 2 509 867 A1 | 1/1983 |
| JP | H05187337 A | 7/1993 |
| JP | H11230813 A | 8/1999 |
| JP | 2005307769 A | 11/2005 |
| JP | 2006214337 A | 8/2006 |
| JP | 2007224816 A | 9/2007 |
| JP | 2008050988 A | 3/2008 |
| WO | 2008090433 A1 | 7/2008 |

\* cited by examiner

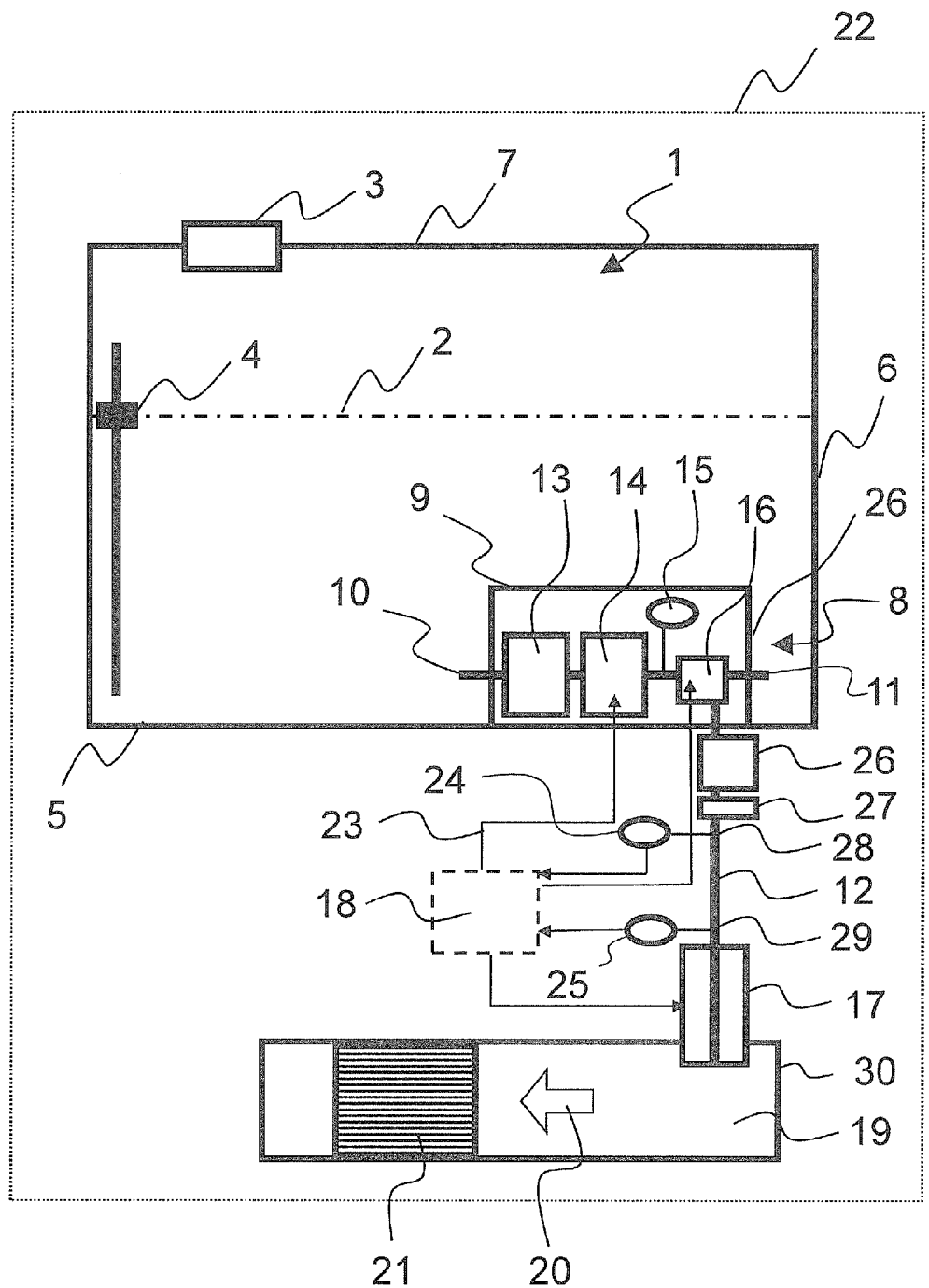

METHOD FOR DETERMINING AN AMOUNT OF LIQUID REMOVED FROM A TANK AND REDUCING AGENT SUPPLY DEVICE FOR A MOTOR VEHICLE

CROSS-REFERENCE TO RELATED APPLICATION

This is a continuation, under 35 U.S.C. §120, of copending International Application No. PCT/EP2011/050121, filed Jan. 6, 2011, which designated the United States; this application also claims the priority, under 35 U.S.C. §119, of German Patent Application DE 10 2010 004 615.9, filed Jan. 13, 2010; the prior applications are herewith incorporated by reference in their entirety.

BACKGROUND OF THE INVENTION

Field of the Invention

The present invention relates to a method for determining an amount of liquid removed from a tank per unit time, in which the liquid is discontinuously fed to exhaust gas of an internal combustion engine. The invention also relates to a reducing agent supply device for a motor vehicle.

In order to remove nitrogen oxides ($NO_x$) in the exhaust-gas flow of internal combustion engines, a liquid reducing agent is preferably injected into the exhaust-gas flow in order to convert the nitrogen oxides contained in the exhaust-gas flow into elemental nitrogen ($N_2$) and water ($H_2O$) through the use of a catalytic converter. An active substance, e.g. ammonia ($NH_3$) and/or urea ($CH_4N_2O$), is preferably dissolved in water and added as liquid reducing agent. A tank which is provided for storing the liquid reducing agent interacts with a supply unit in such a way that a supply of the reducing agent from the tank to the exhaust-gas flow is made possible.

In order to be able to fill up the tank in good time after using up a large part of the liquid, it is desirable to be informed at all times about the amount of liquid remaining in the tank. Various methods are known for determining the content of the tank. Thus, it is known to determine the filling level of the liquid remaining in the tank with the aid of a filling-level indicator and to determine the amount of liquid remaining therefrom. A disadvantage of that method is that it is only possible to inaccurately determine the filling level while driving, particularly in the case of flat tanks, because the liquid is constantly in motion as a result of roadway unevenness. Nor is it possible to determine the amount of fluid in the tank accurately when stopping on an inclined surface.

Other methods provide for determining the amount of liquid supplied by monitoring pump parameters. A disadvantage in that case is that further parameters of the liquid must be available for accurately determining the amount of liquid, for example pressure, density and/or temperature. In the case of systems that provide for a temporary storage area of the liquid downstream of the pump in the flow direction and make it possible to return the liquid to the tank, the precise amount of liquid fed to the exhaust gas is unknown because the amount of liquid returned to the tank is not measured.

Furthermore, it is known to use mechanically moved counting or measuring apparatuses for measuring the through-flow. Those apparatuses supply inaccurate values, particularly in the case of highly transient, i.e. quickly changing, amounts flowing through.

SUMMARY OF THE INVENTION

It is accordingly an object of the invention to provide a method for determining an amount of liquid removed from a tank and a reducing agent supply device for a motor vehicle, which overcome the hereinafore-mentioned disadvantages or at least mitigate the highlighted problems of the heretofore-known methods and devices of this general type. More particularly, it is an object of the invention to specify a method with which the amount of liquid fed to an exhaust gas can be determined and with which it is possible to infer the state of other components of an exhaust-gas aftertreatment unit. Moreover, the specific reducing agent supply device for a motor vehicle should have a simple construction and be able to reliably and precisely implement a corresponding method.

With the foregoing and other objects in view there is provided, in accordance with the invention, a method for determining an amount of liquid removed from a tank per unit time. The method comprises discontinuously feeding the liquid removed from the tank through an injection line to exhaust gas of an internal combustion engine, simultaneously measuring time-dependent pressures at least at two respective points in the injection line, and determining an amount of the liquid supplied per unit time from the measured pressures.

In this case, "discontinuous" feeding means that there is no continuous liquid flow (in other words no constant, unchanging, etc. liquid flow either) through the injection line. As an example, the liquid flow can discontinue from time to time and abruptly restart. For example, this is the case if a (e.g. elastic and/or rigid) temporary storage area and optionally a valve are disposed between the tank and the injection line, with the temporary storage area being put under pressure with liquid from the tank by a pump and the addition of the liquid into the injection line being regulated by the valve (e.g. for branching off a return line back into the tank). In order to feed liquid into the injection line, the valve can be opened for predeterminable times (in particular for operating the device).

According to the invention, the liquid is fed through an injection line, at the exhaust-gas-side end of which (at least) one injector can be disposed, which enables spraying of the liquid into the exhaust gas. The injector can likewise be regulated by a type of valve and a nozzle can optionally also equally be used.

Pressure transducers for measuring the pressures are disposed at a first point and at a second point in the injection line. In this case, the first point is preferably situated as close as possible to the tank for the liquid (but downstream of the pump in the flow direction of the liquid—delivery side) and the second point is preferably as close as possible to the end of the injection line in the vicinity of the injector. This provides a distance that is a large as possible between the first point and the second point, as a result of which it is possible to determine the amount of liquid fed per unit time more precisely. Since electric supply cables and signal leads to the tank and the injector are already present, it is furthermore possible to connect the pressure sensors to the available electronics in a simple manner.

The unit of time, for which the amount of liquid being fed is determined, should at most be selected to be so short that a precise pressure measurement still is possible. On the other hand, the pressure should not change excessively during the unit of time.

The flow speed of the liquid in the injection line per unit time can be determined from the measured pressure at the first point and at the second point with the aid of suitable equations for flows in pipes. An amount of liquid per unit time can be determined from the flow speed per unit time and data regarding the injection pipe geometry and/or from experimental data regarding the relevant injection line. A detailed discussion of the underlying equations is, for example, provided in German Patent DE 31 28 168 C2, the entire content of which is referred to and incorporated into this description by reference.

A "liquid" is more particularly understood to mean a substance which has a liquid state of matter at least at room temperature. The liquid very preferably is a reducing agent for treating nitrogen oxides as they occur in the exhaust gas of internal combustion engines. By way of example, in addition to ammonia, a liquid reducing agent is also understood to mean an ammonia precursor such as e.g. urea. The liquid reducing agent can additionally have at least one freezing temperature reducing substance, and also small particles which do not impede supply. In this respect, "liquid" specifies a generic term, in particular, for precisely these types of reducing agent.

In accordance with another mode of the invention, the overall amount of liquid removed between a first time and a second time is preferably established by integrating the amounts of liquid removed per unit time over the period of time from the first time to the second time. In particular, this means that, in the case of discretely established amounts of liquid per unit time, the overall amount of liquid emerges by adding all discretely established amounts of liquid per unit time over the considered period of time.

Advantageously, the pressures are measured at the at least two points with a repetition frequency, which is inversely proportional to the unit of time, of at least 100 Hz [1/second], preferably at least 1000 Hz, particularly preferably at least 10,000 Hz. As a result of a high repetition frequency of the measurement, it is possible to particularly precisely determine the overall amount of liquid fed over the period of time. Furthermore, it is advantageous if the pressure transducers record the measurement values with a relatively small measurement error of less than 2%, preferably less than 0.5%.

In accordance with a further particularly advantageous mode of the invention, the amount of liquid present in the tank is determined at the first time and the amount of liquid present at a second time is established by subtracting the established amount of liquid removed from the amount of liquid present at the first time. As a result of this, the amount of liquid present in the tank is known at all times, as is the amount of liquid that was fed to the exhaust gas during an injection.

In order to be able to determine the amount of liquid present, an amount of liquid situated in the tank must be predetermined at one time. By way of example, this can be brought about manually after filling the tank. However, a sensor can also be provided which monitors the filling process and establishes the amount of liquid in the tank after the filling process. A single measurement point, for example in a standing, horizontal alignment of the motor vehicle after the filling process, would suffice in order to determine from this time the amount of liquid in the tank by using the method according to the invention.

In accordance with an added advantageous mode of the invention, the amount of liquid present in the tank is established virtually continuously after the first time in such a way that a value for the amount of liquid present in the tank is available at all times. Hence it is possible to fill up the tank before the latter is completely empty. In the case where the refilling amount is known, it is moreover possible to recalibrate the system.

In accordance with an additional advantageous mode of the invention, the liquid is fed in discontinuous injections with a duration of less than 100 ms [milliseconds], preferably of less than 10 ms. Hence the method can be used particularly well in injection processes that can hardly be measured by mechanical through-flow measurement methods.

In accordance with yet another advantageous mode of the invention, no more than 0.1 ml [milliliters], preferably no more than 0.05 ml, particularly preferably no more than 0.015 ml of liquid is fed during one injection. Hence the method is also suitable for determining very small amounts of liquid.

In accordance with yet a further advantageous mode of the invention, the pressures are only measured while the liquid is being fed. This prevents amounts of liquids which are not running liquids but have been caused by interferences, such as e.g. vibrations caused by unevenness on the road surface, from apparently being measured.

In accordance with yet an added advantageous mode of the invention, the amount of liquid being fed is determined by solving non-stationary flow equations for compressible media, as disclosed in German Patent DE 31 28 168 C2, for example. Discontinuous feeding of the liquid to an exhaust gas involves processes that cannot be described precisely enough by stationary equations. The proposed method therefore also allows a very precise measurement of the amount of liquid per time interval in the case of highly transient processes. Liquids must also be considered to be compressible in the case of such processes.

In accordance with yet an additional mode of the invention, the pressures at the at least two points are preferably measured again during a time interval in which a sound signal does not reach the second point from the first point through the liquid in the injection line. The non-stationary flow equation of compressible media is based on a pressure wave compressing the medium and this compression influencing the propagation speed of the pressure wave. This, in turn, is reflected in the speed of the liquid flow. It is therefore expedient to perform a second measurement before a sound wave which has already passed the first point reaches the second point.

In accordance with again another advantageous mode of the invention, the amounts of liquid removed per unit time are compared to predeterminable intended amounts and a fault signal is generated in the case of deviations above predeterminable tolerances. Such a method also enables a so-called "on-board diagnosis" by comparing the amounts of liquid fed, established from the pressure measurement, to parameters of other elements for plausibility. The "intended amounts" can more particularly be available as values (or value ranges) stored and/or calculated in a controller.

In accordance with again a further advantageous mode of the invention, the amounts of liquid removed per unit time are compared to predeterminable intended amounts and, if the intended amounts are undershot, liquid is fed once again. Thus, liquid can be fed often to the exhaust gas in a controlled fashion until the predetermined intended amount is reached or the duration of feeding liquid is increased, with the length of an injection pulse thus consequently being increased. This ensures that the catalytic converter has enough reducing agent available at all times for an optimal conversion of the nitrogen oxides.

In accordance with again an added mode of the invention, in this context, it is likewise advantageous to predetermine the intended amounts in dependence on parameters of other components of an exhaust-gas system of the internal combustion engine. Thus, for example, it is possible to infer a malfunction of the injector if there should in fact be a liquid flow as a result of an opened valve and sufficient pressure, but there is no or only a restricted onset of the flow. The non-existent or only restricted liquid flow can be detected by the method according to the invention.

With the objects of the invention in view, there is concomitantly provided a reducing agent supply device for a motor vehicle having an exhaust-gas line. The supply device comprises a tank for a liquid reducing agent, an injector which may be attached to the exhaust-gas line of the motor vehicle, an injection line, a supply unit configured to deliver the liquid reducing agent through the injection line to the injector, at least two pressure sensors for measuring a pressure, and a controller configured to carry out the method according to the invention. With respect to the preferred specifications of the reducing agent supply device (e.g. the position of the sensors and the supply unit, etc.), reference is likewise made to the explanations given in conjunction with the method according to the invention as well as to the illustrations and the following description of the FIGURE.

Alternatively or cumulatively, the method according to the invention can also be used to determine an amount of a liquid per unit time being fed toward an exhaust-gas line of a motor vehicle.

Other features which are considered as characteristic for the invention are set forth in the appended claims, noting that the steps and features recited individually in the claims can be combined together in any technologically expedient manner and can be supplemented by explanatory information from the description, with further embodiment variants of the invention being highlighted.

Although the invention is illustrated and described herein as embodied in a method for determining an amount of liquid removed from a tank and a reducing agent supply device for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The FIGURE of the drawing is a diagrammatic, lateral-sectional view of a motor vehicle having a device with a tank and a supply unit for carrying out the method according to the invention.

DETAILED DESCRIPTION OF THE INVENTION

Referring now in detail to the single FIGURE of the drawing, there is seen a diagrammatic illustration of a motor vehicle 22 having a tank 1 for storing a liquid 2, more particularly for storing a liquid reducing agent such as an aqueous urea solution. The tank 1 defines an internal space formed by its delimiting walls which include, in this case, an upper tank cover 7, a tank bottom 5 disposed at the bottom and tank sides 6 situated therebetween. The tank 1 illustrated herein moreover has a filling opening 3 in the tank cover 7, through which the tank 1 can be filled with the liquid 2 in a manner meeting demands. It is also conventional for such a tank 1 to have one or more filling-level indicators 4.

A chamber 9 with a supply unit 8 disposed therein is formed off-center on the tank bottom 5. There is no liquid 2 in the chamber 9. Instead, components for supplying the liquid 2 from the tank 1 to an injector 17 are disposed therein. In this case, the supply unit 8 removes liquid 2 from the interior of the tank 1 through an outlet 10, which is likewise disposed in the vicinity of the tank bottom 5. The supply unit 8 initially includes (in a through-flow order specified herein, starting from the outlet 10) a filter 13, then a pump 14 and a return valve 16, through which the liquid is routed to the injector 17 during operation. A temperature sensor 15 can be provided in a line section between the pump 14 and the return valve 16. As an alternative to passing on the liquid 2 to an injector 17, the return valve 16 also enables a supply to a return line 11, through which the liquid 2 is fed back to the tank 1 again, and thus returns out of the chamber 9 into the tank.

A temporary storage area 26, a first pressure sensor 24 at a first point 28 and a second pressure sensor 25 at a second point 29 are disposed in an injection line 12 in a direction toward the injector 17. The pump 14 sets a pressure of approximately 10 bar (which is application related and is e.g. between 8 and 12 bar) in the temporary storage area 26 and keeps this pressure approximately constant (although further valves can optionally be additionally used). In the case of a small temporary storage area 26, this may lead to the pressure of approximately 10 bar in the temporary storage area 26 having to be reestablished through the use of the pump 14 after actuating a valve 27 twice (e.g. even if the valve 27 is implemented in the injector 17).

A controller 18 is provided for the operation of the pump 14, the return valve 16, the valve 27, the injector 17 and/or further components. The controller 18 is connected by signal leads 23 to components, more particularly to the first pressure sensor 24 and the second pressure sensor 25. Additionally, the controller 18 can be connected to various sensors and/or superior controllers (e.g. a motor controller) in order to activate the supply or a heater in a manner meeting demands. The controller 18 can likewise be integrated into the chamber 9.

The liquid 2 is supplied into the temporary storage area 26 by the supply unit 8 and there it is placed at a pressure of up to 12 bar. The valve 27 regulates the supply of the liquid 2 to the injector 17. The injector 17 feeds the liquid 2 to an exhaust-gas line 30 through which exhaust gas 19 flows in a predetermined flow direction 20. In the process, evaporation (e.g. thermophoresis) or conversion (e.g. hydrolysis) of the liquid 2 into a reducing agent for nitrogen oxides can occur, optionally with the aid of catalytically active substances. This mixture of reducing agent and exhaust gas can then be fed to an exhaust-gas treatment unit 21, more particularly a catalytic converter, in such a way that the nitrogen oxides in the exhaust-gas line 30 are reduced. In this case, the liquid 2 is preferably added while taking into account the amount of liquid 2 required in the exhaust-gas line 30. When the motor vehicle 22 is turned off, the liquid 2 situated in the temporary storage area 26 is released into the tank 1.

During operation, the first pressure sensor 24 and the second pressure sensor 25 respectively measure pressures in the injection line 12 at the first point 28 and at the second point 29, with the measurements being taken at rates of up to a few 100,000 Hz. The amount of liquid flowing through the injection line during one unit of time is determined from initial conditions, which need to be predetermined, and the measured pressure values. By integrating the amounts of liquid per unit time over a predeterminable period of time, it is possible to determine the overall amount of liquid that flows through the injection line 12 during the period of time. By subtracting the determined amount of liquid from the previously established or previously determined amount of liquid in the tank, it is possible to determine the current amount of liquid in the tank at all times.

The method according to the invention renders it possible to establish the precise consumption of a liquid and moreover to determine the amount of liquid remaining in the tank. Furthermore, the method according to the invention renders an on-board diagnosis possible.

The invention claimed is:

1. A method for controlling an amount of liquid removed from a tank per unit time, the method comprising the following steps:
    discontinuously feeding the liquid removed from the tank through an injection line via a valve to exhaust gas of an internal combustion engine;
    setting and maintaining a substantially constant pressure in a temporary storage area in the injection line with a supply pump;
    simultaneously measuring time-dependent pressures at least at two respective points in the injection line with respective pressure sensors disposed at the at least two respective points in the injection line downstream of the temporary storage area; and
    determining, in a controller, an amount of the liquid supplied per unit time from the measured pressures, where the amount of liquid supplied per unit time is the amount of liquid removed from the tank per unit time, the liquid being urea dissolved in water;
    comparing the amount of liquid removed per unit time to predeterminable amounts in the controller and the controller controlling the valve for feeding the amount of liquid removed per unit time so that the amount matches a predetermined intended amount of liquid removed per unit time.

2. The method according to claim 1, which further comprises establishing an overall amount of liquid removed between a first time and a second time by integrating amounts of liquid removed per unit time over a period of time from the first time to the second time.

3. The method according to claim 2, which further comprises determining an amount of liquid present in the tank at the first time and establishing an amount of liquid present in the tank at the second time by subtracting the established overall amount of liquid removed, from the determined amount of liquid present at the first time.

4. The method according to claim 3, which further comprises continuously establishing the amount of liquid present in the tank after the first time in such a way that a value for the amount of liquid present in the tank is available at all times.

5. The method according to claim 1, which further comprises feeding the liquid in discontinuous injections of less than 100 ms.

6. The method according to claim 5, which further comprises feeding no more than 0.1 ml of the liquid during one injection.

7. The method according to claim 1, which further comprises measuring the pressures only while the liquid is being fed.

8. The method according to claim 1, which further comprises measuring the pressures again at the at least two points during a time interval in which a sound signal does not reach the second point from the first point through the liquid in the injection line.

9. The method according to claim 1, which further comprises determining the amount of liquid fed by solving the non-stationary flow equation for compressible media.

10. The method according to claim 1, wherein if the predeterminable amounts are undershot, feeding liquid once again or increasing a duration of a liquid feed.

11. The method according to claim 10, which further comprises predetermining the intended amounts in dependence on parameters of other components of an exhaust-gas system of the internal combustion engine.

12. The method according to claim 1, which further comprises predetermining the intended amounts in dependence on parameters of other components of an exhaust-gas system of the internal combustion engine.

13. The method according to claim 1, wherein the discontinuous feeding of the liquid is performed through an injector with a valve and a nozzle.

14. The method according to claim 1, wherein the measuring of the pressures at the at least two points is performed with a repetition frequency of at least 100 Hz.

15. A reducing agent supply device for a motor vehicle having an exhaust-gas line, the supply device comprising:
    a tank for a liquid reducing agent;
    an injector for injecting the liquid reducing agent into the exhaust-gas line;
    an injection line connected between said tank and said injector;
    a supply pump for delivering the liquid reducing agent from said tank through said injection line to said injector;
    a temporary storage area in said injection line;
    a valve for controlling a feed of the liquid reducing agent from the injector;
    at least two pressure sensors respectively disposed at at least two respective points in the injection line, downstream of said temporary storage area, for measuring a pressure of the liquid reducing agent; and
    an electronic controller connected to said pressure sensors, said injector and said supply pump and said electronic controller configured for:
    discontinuously feeding the liquid removed from the tank through the injection line to exhaust gas of an internal combustion engine;
    setting and maintaining a substantially constant pressure in said temporary storage area with said supply pump;
    simultaneously measuring time-dependent pressures at least at the two respective points in the injection line with said at least two pressure sensors; and
    determining an amount of the liquid supplied per unit time from the measured pressures, where the amount of liquid supplied per unit time is the amount of liquid removed from the tank per unit time, the liquid being urea dissolved in water;

comparing the amount of liquid removed per unit time to predeterminable amounts and the controller controlling the valve for feeding the amount of liquid removed per unit time so that the amount matches a predetermined intended amount of liquid removed per unit time.

16. The supply device according to claim 15, wherein said injector is attached to the exhaust-gas line of the motor vehicle.

17. The supply device according to claim 15, further comprising a supply unit which includes said supply pump.

* * * * *